United States Patent
Bracklo et al.

(10) Patent No.: US 6,624,738 B2
(45) Date of Patent: *Sep. 23, 2003

(54) ELECTRONIC CONTROL UNIT FOR A MOTOR VEHICLE WITH DATA NETWORKS AND IMMOBILIZER

(75) Inventors: Claas Bracklo, Stuttgart (DE); Peter Hanf, Göppingen (DE); Heinz Leiber, Oberriexingen (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/678,678

(22) Filed: Jul. 11, 1996

(65) Prior Publication Data

US 2003/0011487 A1 Jan. 16, 2003

(30) Foreign Application Priority Data

Jul. 11, 1995 (DE) .......................... 195 25 180

(51) Int. Cl.⁷ ............................. H04Q 1/00
(52) U.S. Cl. ..................... 340/3.51; 307/10.1; 709/250
(58) Field of Search ...................... 340/825.72, 825.07, 340/825.5, 3.51; 370/352; 455/426; 395/280; 307/10.1

(56) References Cited

U.S. PATENT DOCUMENTS

| | | | | |
|---|---|---|---|---|
| 4,716,408 A | * | 12/1987 | O'Conner ................ | 340/825.5 |
| 5,229,648 A | * | 7/1993 | Sues et al. ................ | 340/5.65 |
| 5,243,704 A | * | 9/1993 | Baty et al. ................ | 395/280 |
| 5,436,890 A | * | 7/1995 | Read ........................ | 370/352 |
| 5,481,253 A | | 1/1996 | Phelan et al. | |
| 5,548,631 A | * | 8/1996 | Krebs ....................... | 455/426 |
| 5,555,863 A | | 9/1996 | Kokubu | |

FOREIGN PATENT DOCUMENTS

| | | |
|---|---|---|
| DE | 39 34 974 A1 | 2/1991 |
| DE | 41 10372 A1 | 10/1991 |
| DE | 44 01 785 A1 | 7/1994 |
| DE | 44 11 451 C1 | 4/1995 |
| DE | 44 14 644 A1 | 4/1995 |
| DE | 195 15 194 A1 | 11/1996 |
| EP | 0 596 762 A1 | 10/1993 |
| EP | 0 704 353 A1 | 3/1996 |
| FR | 2 700 308 | 7/1994 |
| GB | 2 251 503 A | 8/1992 |
| JP | A 56 248 | 3/1989 |
| JP | A 21 106 | 1/1995 |
| JP | A 211 826 | 8/1997 |
| WO | WO 93/05987 | 1/1993 |

* cited by examiner

Primary Examiner—Brian Zimmerman
(74) Attorney, Agent, or Firm—Crowell & Moring LLP

(57) ABSTRACT

The invention relates to an electronic control unit for a motor vehicle with a plurality of data networks and an electronic immobilizer. The control unit according to the invention is configured both as a vehicle-end control section for the electronic immobilizer and as a gateway between at least two of the data networks. At least one component of the gateway also serves as a component of the vehicle-end control section for the electronic immobilizer. Preferably, there is common use of components of the gateway for the immobilizer function such that, in addition to the normal vehicle-end immobilizer control section, a further, redundant vehicle-end immobilizer control section, is formed, which significantly reduces the failure rate of the immobilizer.

4 Claims, 2 Drawing Sheets

ELECTRONIC CONTROL UNIT FOR A MOTOR VEHICLE WITH DATA NETWORKS AND IMMOBILIZER

BACKGROUND AND SUMMARY OF THE INVENTION

The invention relates to an electronic control unit for a motor vehicle equipped with a plurality of data networks and an electronic immobilizer.

It is an increasing tendency for vehicles today to be equipped with an electronic immobilizer. In addition to simple systems which interrupt the engine starting process, the fuel pump relay and/or the ignition via a relay, more advanced systems involve a direct data communication between the electronics of the immobilizer and an engine controller, this communication usually being achieved via a databus, such as a CAN-bus. The immobilizer is usually initialized from an electronic key, either via remote control or via a transponder in the key in conjunction with an induction coil.

This arrangement provides a high degree of protection against theft, in particular when high-quality data exchange codes, protected on a cryptological basis, are used; it also requires a certain degree of electronic complexity. An example of such a modern immobilizer is the system described in the German Patent Application P 44 11 451.6-51. The additional electronics for the immobilizer of course entails additional possible failures, the result of which could be an unintended situation in which the vehicle can no longer be started even by the person authorized to do so.

On the other hand, in modern vehicles, data networks are frequently used for the communication of the electronic vehicle components with one another. These networks can have very different structures, for example star-shaped structures are frequently realized, in which the various networks are linked in a control unit, frequently the so-called combined instrument which primarily serves to control the display and control elements. In early systems, in such contexts at maximum specific isolated signals were transmitted from one network to the other.

Networks which permit a complete signal transmission between the individual connected networks via a so-called gateway are considered to be advanced. For example, the realization of the gateway in a central control unit or in the combined instrument has been proposed in the literature. In the case of a motor vehicle described in German patent document DE 41 10 372 A1, three networks are provided, one for diagnostic purposes, one for control unit networking and one for vehicle accessories, such as switches and measuring instruments. The three networks are connected to one another with a gateway which can be configured as a stand-alone module between the three networks or can be accommodated in a network node of one of the networks.

An object of the present invention is to provide an electronic control unit for a motor vehicle with a plurality of data networks and an electronic immobilizer, which can be used to provide the immobilizer function and a gateway function for the networks with relatively little outlay.

Another object of the invention is to provide the conditions which permit the immobilizer to be given a redundant configuration with little additional outlay.

These and other objects and advantages are achieved according to the invention by the combination of the gateway and vehicle-end control section of the immobilizer in a single control unit. This arrangement permits multiple use of electronic components in the control unit so that the outlay on components can be reduced in comparison with a separate realization of these two functions.

In a particularly advantageous embodiment of the invention, redundancy for the vehicle-end control section of the immobilizer is achieved so that the probability of an unintended situation in which the vehicle can no longer be started owing to a failure of the vehicle-end control section of the immobilizer is significantly reduced in comparison with immobilizer systems which do not have a redundant configuration.

Another embodiment of the invention realizes a control unit design containing, with relatively few components, a gateway, a vehicle-end control section for the immobilizer and a redundant immobilizer control section which is parallel to the latter. As many components as possible are used doubly, on the one hand for the gateway and on the other hand for the immobilizer. In particular, the two microprocessors which are required for the gateway are used for the two immobilizer control sections 80, so that separate microprocessors are not required for the latter.

In a preferred positioning of the combination of the gateway and vehicle-end immobilizer control section in an electronic ignition starter switch, the ignition starter switch performs not only its normal ignition starter control function, a gateway function, and a control function for the immobilizer; it also provides redundancy of the immobilizer function.

Other objects, advantages and novel features of the present invention will become apparent from the following detailed description of the invention when considered in conjunction with the accompanying drawings.

DETAILED DESCRIPTION OF THE DRAWING

Figure 1:
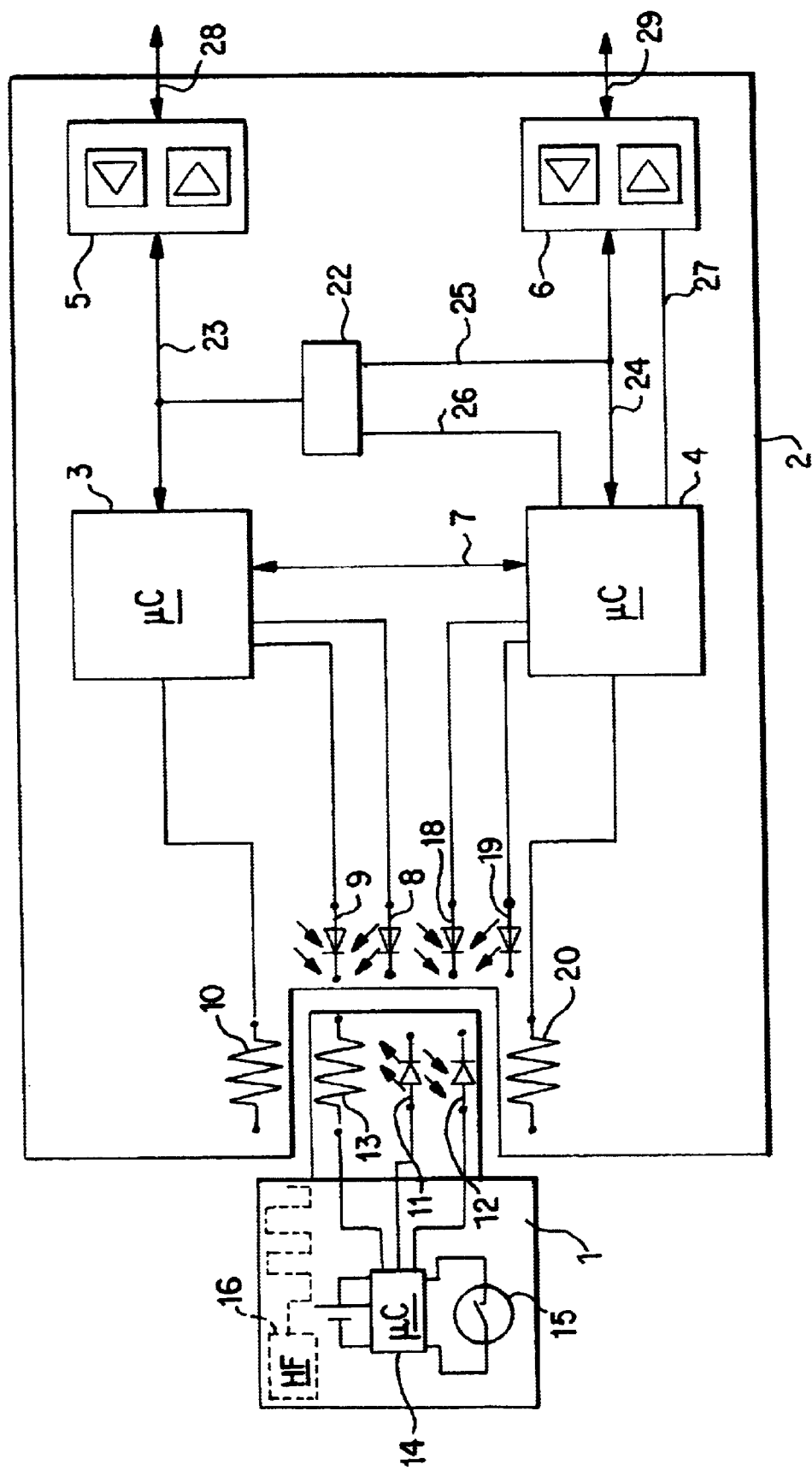
FIG. 1 shows an electrical block diagram of an ignition starter switch with associated electronic key for a motor vehicle with a plurality of data networks and an electronic immobilizer according to the invention.

Illustrated in a block diagram in the Figure there is an electronic key (1) inserted in the functional position into an electronic ignition starter switch (2). An exchange of information takes place between the two units (1, 2) via an infrared link, for which purpose the key has an IR transmitter (11) and an IR receiver (12), and the ignition starter switch (2) has an IR transmitter (8) and an IR receiver (9). Provided in the ignition starter 1-5 switch (2) is a first microprocessor (3) to which the IR transmitter (8) and the IR receiver (9) are connected, and which is connected via a bidirectional interface (23) to a first input/output (I/O) unit (5). The latter, in turn, is connected via a bidirectional interface (28) to a databus system network, for example a CAN-bus system or the like, which interconnects at least the electronic vehicle components required for engine control.

Figure 2:
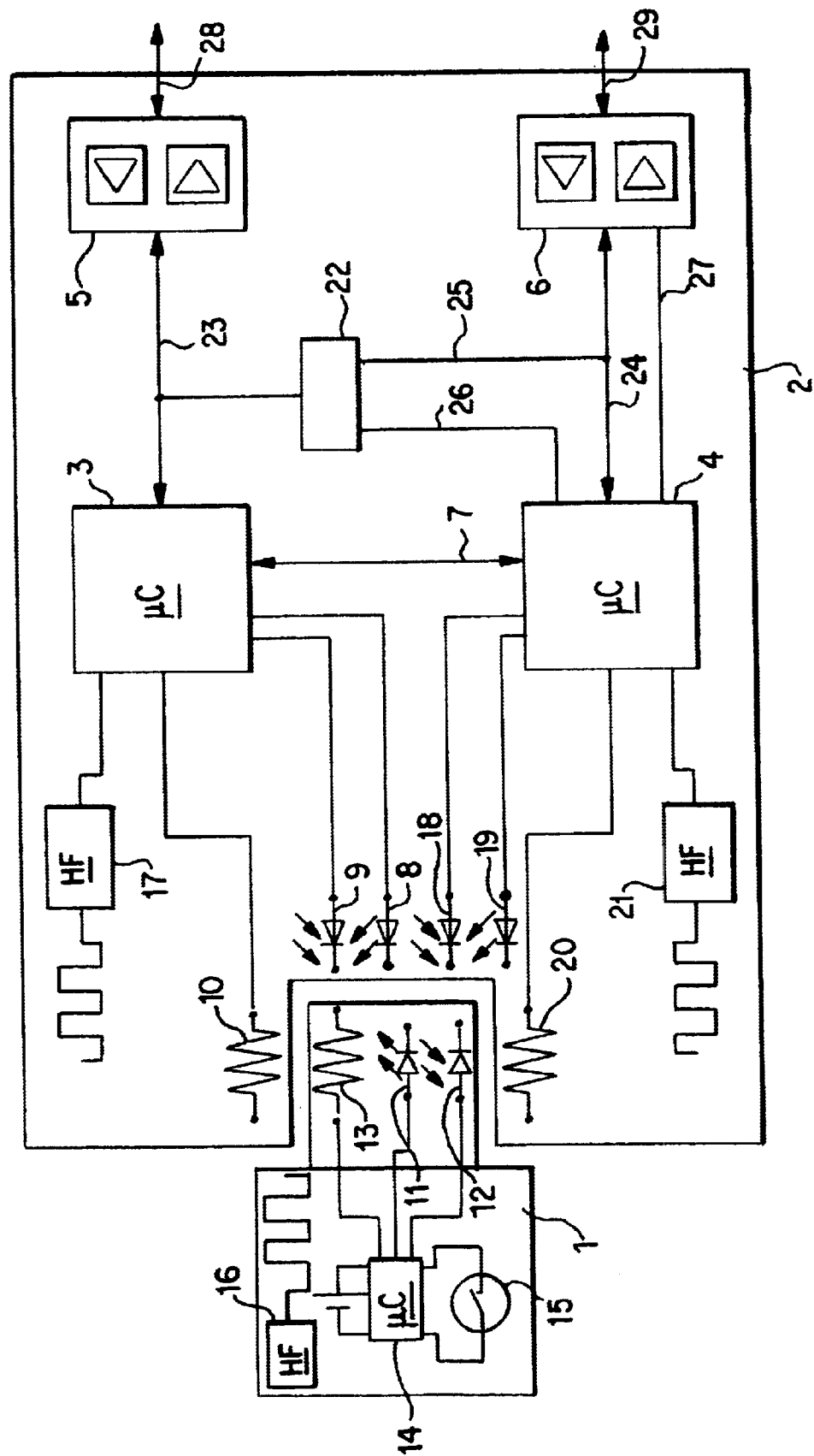
FIG. 2 shows an electrical block diagram of the apparatus of FIG. 1, which incorporates an optical radio frequency transmission link.

A microprocessor (14) is also provided in the key (1). The IR transmitter (11) and the IR receiver (12) are connected to this microprocessor (14), which also monitors a circuit into which a control button (15) is connected. The key (1) obtains the necessary energy from the vehicle independently of the battery via an inductive coupling (10, 13) and the ignition starter switch (2). Optionally, a radio frequency transmission link (16, 17) to the associated components in the key (1) or in the ignition starter switch (2) may be provided additionally or alternatively between the key (1) and ignition starter switch (2), as shown in FIG. 2. A control button (15) of the key (1) serves to actuate a vehicle locking system.

In order to start the vehicle, after the key has been inserted, the key (1) and the first microprocessor (3) of the ignition starter switch (2) communicate via the bidirectional infrared link, from which the first microprocessor (3) detects the desire to start, and also tests the authorization of the electronic key (1) by means of its authorization code which is transferred in encrypted form. In this context, the first microprocessor (3) is configured as a control unit of an electronic immobilizer which is formed in this way, the said microprocessor (3) only enabling an engine starting process if it has detected the authorization of the key (1) by means of the decoding and decryption of the received authorization code. If this is the case, a vehicle-specific enabling algorithm is performed between the engine controller and microprocessor (3), at the end of which the engine can be started.

The electronic ignition starter switch (2) also contains a gateway between the engine control network and a further network, for example a convenience control network, via which convenience controls, such as central locking, window lifter control, automatic seat positioning, automatic mirror adjustments and the control of display elements can be performed. In order to realize the gateway, the ignition starter switch (2) has in parallel with the first microprocessor (3) and the first I/O unit (5), in addition to the associated interfaces (23, 28) once again the same arrangement in parallel with a second microprocessor (4), a second I/O unit (6), a bidirectional data interface (24) between these two units (4, 6) and a bidirectional data connection line (29) to the convenience control network.

A bidirectional data interface (7) between the first microprocessor (3) assigned to the engine control network and the second microprocessor (4) assigned to the convenience control network realizes the gateway. If data are to be transmitted from the engine control network to the convenience control network, the first microprocessor (3) receives the said data via the associated first I/O unit (5) and transfers them via the data interface (7) to the second microprocessor (4) which, via the associated second I/O unit (6), introduces the said data into the convenience control network as desired. The procedure is adopted in the opposite direction if data are to be transferred from the convenience control network to the engine control network.

The first microprocessor (3) and the first I/O unit (5) are thus both part of the gateway and part of the normal ignition starter switch function, including the immobilizer function. The arrangement of a second microprocessor (4) in the ignition starter switch (2) in order to fulfil the gateway function is also additionally used to provide redundancy of the immobilizer function. For this purpose, the IR transmitter (8), the IR receiver (9) and, optionally or alternatively, the radio-frequency transmission unit (17) which are coupled to the first microprocessor (3) are duplicated in that a further IR transmitter (19), a further IR receiver (18) and, optionally or alternatively, a further radio-frequency transmission unit (21), FIG. 2 are arranged in the ignition starter switch (2) for the communication with the key (1) and are coupled to the second microprocessor (4). Furthermore, by means of a second inductive coupling (13, 20) which is also coupled to the second microprocessor (4), the energy supply for the key (1) is also given redundant configuration. In order to complete a second, redundant control section of the immobilizer for the vehicle, an intelligent bus coupler (22) is provided, via which the data interface (24) between the second microprocessor (4) and the second I/O unit (6) is connected to the data interface (23) between the first microprocessor (3) and the first I/O unit (5). This intelligent bus coupler can be actuated by the second microprocessor (4) via a control line (26). The second microprocessor (4) is able to actuate the second I/O unit (6) via a further control line (27).

As long as the normal control section of the immobilizer in the ignition starter switch (2) (i.e. in particular the immobilizer function in the first microprocessor (3) and the data transmission via the first IR transmitter (8) and the first IR receiver (9)) operates without faults, the second microprocessor (4) keeps the bus coupler (22) disabled and enables the second I/O unit (6) for the inputting and outputting of data. If, however, this control section which is normally used for the immobilizer function in the ignition starter switch (2) is no longer operationally capable (for example because of a fault in the immobilizer functional component in the first microprocessor (3)), the second microprocessor (4) activates the bus coupler (22) which in response enables the data transmission from the data output of the second microprocessor (4) to the first I/O unit (5) and actuates the second I/O unit (6) in a suitable fashion so as not to disrupt the transmission of immobilizer signals from the second microprocessor (4) to the first I/O unit (5) as a result of signal transmissions from or to the convenience control network via the second I/O unit (6). Thus, even if there is a fault on the normal immobilizer signal path, the immobilizer function can be maintained via the redundant immobilizer signal path from the key (1) to the engine control network via the second microprocessor (4), the intelligent bus coupler (22) and the first I/O unit (5). The overall failure rate is significantly reduced by this redundant configuration of the vehicle-end control section of the immobilizer. For example, given an individual reliability of one immobilizer signal path of 100 ppm, the failure rate of the redundant immobilizer circuit is only 0.01 ppm so that the vehicle is virtually never unintentionally disabled because of a defective immobilizer. If required, the key-end component of the immobilizer could also be given redundant configuration, but this is less critical since a spare key is usually available and this provides redundancy.

Thus, with comparatively little outlay on components, the ignition starter switch according to the invention fulfills both the immobilizer function and the gateway function. Although, because of the possibility of directly introducing the immobilizer signal into the engine control network, the ignition starter switch constitutes the electronic control unit which is preferred for combining the immobilizer function and gateway function, if appropriate, another control unit can also be configured with the purpose of combining these two functions, for example, a suitably designed combined instrument.

As an alternative to the direct connection of the two microprocessors (3, 4) via the data interface (7) as shown in the Figure, it is possible, while omitting the latter, to make provision for the corresponding data transmission to take place via the intelligent bus coupler (22). Moreover, in a modification of the invention, it is possible to provide that data transmission between the respective microprocessor (3, 4) and its associated I/O unit (5, 6) does not take place directly but rather via the intelligent bus coupler (22), for which purpose the data interface connections of the microprocessors (3, 4) and of the I/O units symmetrically connected to only one associated connection of the intelligent bus coupler (22).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electronic control unit for a motor vehicle having a plurality of data networks and an electronic vehicle immobilizer, wherein:

said control unit is configured both as a vehicle end control section for the electronic immobilizer and as a gateway between at least two of the data networks; and at least one of the components of the gateway also forms a component of the vehicle-end control section for the electronic immobilizer;

a further redundant vehicle-end control section is provided for the electronic immobilizer;

at least one component of the gateway also forms a component of the redundant vehicle-end control section for the electronic immobilizer, the gateway contains at least first and second parallel microprocessors and first and second associated input/output units;

the first microprocessor of the gateway serves as a control unit for a first vehicle-end control section for the electronic immobilizer, and the second microprocessor of the gateway serves as a control unit for a further, redundant, vehicle-end control section for the electronic immobilizer;

a first one of the two input/output units forms a common input/output unit for the first vehicle-end control section and the further redundant vehicle end control section, for the electronic immobilizer; and an intelligent bus coupler, which can be actuated by the microprocessor of the redundant vehicle-end control section for the electronic immobilizer, is provided to connect data output from said second microprocessor to the first input/output unit, which is assigned to the first microprocessor during normal operation.

2. The electric control unit according to claim 1, wherein said control unit forms an electronic ignition starter switch for the motor vehicle.

3. A motor vehicle comprising:

an ignition starter switch;

an electronic key for exchange of information between the electronic key and the ignition starter switch; and a first microprocessor which is provided in the ignition starter switch, and is connected via a first bidirectional interface to a databus system network that interconnects at least electronic vehicle components required for engine control; wherein, the first microprocessor is configured as a control unit of an electronic vehicle immobilizer, enabling an engine start process only if it has detected an authorization from the key by decoding of a received authorizations code;

the ignition starter switch also contains a gateway between the data bus system network interconnecting the engine control components and a databus network interconnecting convenience control components; and the ignition starter switch has, in parallel with the first microprocessor, a second microprocessor connected via a second bidirectional interface to the network interconnecting convenience control components; wherein said gateway comprises said first and second bidirectional interfaces, and at least said first microprocessor; and said first microprocessor is further configured to perform gateway operations.

4. An electronic control unit for a motor vehicle having a plurality of data networks and an electronic vehicle immobilizer, said electronic control unit being configured to include:

a vehicle mounted control arrangement for said electronic immobilizer, said control arrangement having a first control section that includes a first microprocessor, and a second redundant control section that includes a second microprocessor;

a gateway between at least two of said data networks, said gateway having at least first and second parallel microprocessors and respective associated first and second input/output units; and an intelligent bus coupler; wherein said first and second parallel microprocessors of the gateway constitute and function as the respective first and second microprocessors of the vehicle mounted control arrangement;

the first input/output unit forms a common input/output unit for the first control section and the second, redundant control section for the electronic immobilizer; and said intelligent bus coupler is actuatable by said second microprocessor of the redundant control section for the electronic immobilizer, to connect data from the second microprocessor to the first input/output unit, which is assigned to the first microprocessor during normal operation.

* * * * *